United States Patent
Bloembergen et al.

(10) Patent No.: US 6,921,430 B2
(45) Date of Patent: Jul. 26, 2005

(54) ENVIRONMENTALLY FRIENDLY BIOPOLYMER ADHESIVES AND APPLICATIONS BASED THEREON

(75) Inventors: Steven Bloembergen, Okemos, MI (US); Frans Kappen, Wageningen (NL); Brigit Beelen, Oss (NL)

(73) Assignee: Ecosynthetix Inc., Lansing, MI (US)

( * ) Notice: Subject to any disclaimer, the term of this patent is extended or adjusted under 35 U.S.C. 154(b) by 0 days.

(21) Appl. No.: 10/476,436

(22) PCT Filed: May 2, 2002

(86) PCT No.: PCT/US02/13724

§ 371 (c)(1),
(2), (4) Date: Jul. 12, 2004

(87) PCT Pub. No.: WO02/088271

PCT Pub. Date: Nov. 7, 2002

(65) Prior Publication Data

US 2004/0231559 A1 Nov. 25, 2004

Related U.S. Application Data

(60) Provisional application No. 60/288,259, filed on May 2, 2001.

(51) Int. Cl.[7] .................... C09J 103/02; C09J 103/12
(52) U.S. Cl. ................. 106/206.1; 106/15.05; 106/213.1; 106/215.2; 156/336
(58) Field of Search ............. 106/15.05, 206.1, 106/213.1, 215.2, 162.1, 217.7; 156/336

(56) References Cited

FOREIGN PATENT DOCUMENTS

| EP | 990687 A2 | 4/2000 |
| GB | 1420392 | 6/1973 |
| WO | WO 00/40617 | 7/2000 |
| WO | WO 00/69916 A1 | 11/2000 |

OTHER PUBLICATIONS

"Potassium sorbate", Grant & Hackh's Chemical Dictionary, McGraw–Hill, Inc. 1987, p. 468.*
English Language Derwent Abstract for RO 112743 B1 published Dec. 30, 1997.
English Language Derwent Abstract for CN 1235182 A published Nov. 17, 1999.
PCT Search Report for PCT/US02/13724, no date provided.

* cited by examiner

*Primary Examiner*—David Brunsman
(74) *Attorney, Agent, or Firm*—Quarles & Brady LLP

(57) ABSTRACT

Environmentally friendly biopolymer adhesives are described, wherein the adhesives comprise biopolymer particles, more preferably starch microparticles, and most preferably starch nanoparticles, and their aqueous dispersions. Applications for the biopolymer particle adhesives are described, that are environmentally friendly alternatives to petroleum based synthetic adhesives. The biopolymer particle adhesives provide are biodegradable as well as repulpable, and thus provide bio-based recycling-friendly alternatives to synthetic adhesives derived from petroleum resources.

12 Claims, No Drawings

ENVIRONMENTALLY FRIENDLY BIOPOLYMER ADHESIVES AND APPLICATIONS BASED THEREON

CROSS-REFERENCES TO RELATED APPLICATIONS

This application claims the benefit of U.S. Provisional Patent Application No. 60/288,259 filed May 2, 2001.

STATEMENT REGARDING FEDERALLY SPONSORED RESEARCH

Not Applicable.

BACKGROUND OF THE INVENTION

1. Field of the Invention

The invention relates to the use of a new class of biopolymer-based adhesives that are nano- and/or microparticle, which comprise a biopolymer such as starch, in various adhesive applications. These biopolymer latex adhesives can be applied as replacement solutions for synthetic latex adhesives for a variety of applications to porous and non-porous substrates.

2. Description of the Related Art

WO 00/69916 describes a process for preparing biopolymer nanoparticles using an extrusion process, wherein the biopolymer, for example starch or a starch derivative or mixtures thereof, are processed under high shear forces in the presence of a cross-linking agent. This patent application also describes starch nanoparticles, aqueous dispersions of said nanoparticles, and an extrudate prepared by the process which swells in an aqueous medium and forms a low viscous dispersion after immersion. The particles are also described as having a narrow particle size distribution with particle sizes below 400 nm, and especially below 200 nm, and are further characterized by their viscosity. Various applications are mentioned for use of the nanoparticles. However, no examples are provided to demonstrate the adhesive characteristics of the biopolymer latex nor are any specific adhesive applications mentioned.

WO 00/40617 describes a method for the preparation of starch particles in a two-phase system. The resulting starch particles are small and controllable and can range from 50 nm to 100 μm in diameter. As in the previous patent, various applications of these particles are mentioned. However, no examples are provided to demonstrate these applications.

SUMMARY OF THE INVENTION

We refer to the new adhesives of the present invention as biopolymer latex adhesives. Biopolymer latex adhesives are characterized according to their latex properties and adhesive properties. Latex properties relate to their particle size distributions, dispersion properties, film forming properties, and drying behavior. Adhesive properties relate to the specific application in question.

Biopolymer latex adhesives are attractive for various reasons. These ready-to-use adhesives are stable adhesive dispersions. Also, latex adhesives based on biopolymers are derived from renewable resources, and not from petroleum based raw materials and, therefore, represent an attractive environmental benefit.

Latexes are dispersions of small insoluble particles in water. They are typically in the nanometer size range but can also be in micrometer size range. Latex adhesives are attractive because they can be prepared with high solids contents, are stable dispersions, dry rapidly and are prepared using an environmentally friendly medium (water) without the use of solvents. Latexes are also well known for use in high speed applications of synthetic adhesives such as polyacrylics for pressure sensitive adhesive applications, and polyvinyl acetate, polyethylene vinyl acetates, polyvinyl acetate ethylenes, polystyrene butadienes, etc., for non-pressure sensitive adhesive applications. Today's dominant technology for non-pressure sensitive latex adhesives is polyvinyl acetate, amidst a wide range of synthetic polymer families used as latex adhesives (R. D. Athey, Jr., "Emulsion Polymer Technology", Marcel Dekker, 1991).

Biopolymer latex adhesives can be considered as bio-based substitutes for replacement of petroleum based synthetic latex adhesives used in packaging applications, school glues, removable labels and notes, construction adhesives, and for many other adhesive applications that require latex adhesives.

The potential to replace a synthetic adhesive latex with a biopolymer latex adhesive can be illustrated for the specific application of school glues. This use would not have been expected because natural polymers, such as starch, generally have very poor shelf life stability. The reason for short shelf life stability of aqueous biopolymer dispersions is twofold: (1) starch adhesive solutions and pastes have a strong tendency to gel or retrograde, with stabilities in the order of hours or days; and (2) starch adhesive in water provides a good growth medium for fungi and bacteria. The consumer has become accustomed to the white polyvinyl acetate latex school glues, which are fast drying and have shelf life stability in excess of 6 months.

DETAILED DESCRIPTION OF THE INVENTION

We have found that biopolymer latexes (for example, as prepared in the processes and methods described in WO 00/69916 and WO 00/40617) have unique adhesive properties that make them more attractive than synthetic adhesives derived from petroleum resources. The stability of these biopolymer latexes is, however, still limited to days or weeks, provided the above two issues are not specifically addressed. The formation of nanospheres alone, as per WO 00/69916 for example, provides a biopolymer latex that is not stable for long periods of time, unless the starch used to generate the crosslinked nanoparticles is a high amylopectin based starch (>95% amylopectin, <5% amylose). To prevent fungal or bacterial growth, a suitable non-toxic biocide formulation was developed.

The combination of a high amylopectin based starch and a suitable non-toxic (to humans) biocide allowed the development of a 100% biodegradable school glue that has a shelf life stability in excess of 6 months. The combination of high amylopectin starch nanosphere latex and a suitable non-toxic biocide to provide a safe, 100% biodegradable school glue with shelf life stability in excess of 6 months (i.e., no gelling or retrogradation or microbial growth), is a unique embodiment of this invention. The paper bonding of the starch nanoparticle based latex was found to be compare favorably to polyvinyl acetate latex.

It can be imagined that many other paper adhesive applications can be developed based upon this same application. For example, this invention can be applied to other paper converting operations where paper substrates are adhered to one another and where a drying step is typically used after applying an aqueous adhesive. One example is in the preparation of improved tissue papers or for making multi-ply tissues, napkins, paper towels, etc.

The latexes can be prepared using biopolymers that have been formed into nanoparticles by processing the biopolymer using shear forces and simultaneous crosslinking. Processing using shear forces herein means a mechanical treatment, which is in particular an extrusion treatment performed at elevated temperature (above 40° C., especially above 60° C., below the degradation point of the polymer, up to e.g. 200° C., especially up to 140° C.) under conditions of high shear. The shear can be effected by applying at least 100 Joules of specific mechanical energy (SME) per gram of biopolymer. Depending on the processing apparatus used the minimum energy may be higher; also when non-pregelatinized material is used, the minimum SME may be higher, e.g. at least 250 J/g, especially at least 500 J/g. The mechanical treatment is conveniently performed at elevated temperature. The elevated temperature may be moderated, in case of starch, by using an alkaline medium or by using pregelatinized starch. During the mechanical treatment, the biopolymer is present in high concentration, preferably at least 50 wt. %, in an aqueous solvent, such as water or a water/alcohol mixture. High pressure (e.g. between 5 and 150 bar) may be applied to facilitate processing at high concentrations.

A plasticizer may be present in addition to the water or water/alcohol mixture, such as a polyol (ethyleneglycol, propyleneglycol, polyglycols, glycerol, sugar alcohols, urea, citric acid esters, etc.) at a level of 5–40% by weight of the biopolymer. However, water can already act as a plasticizer. The total amount of plasticizers (i.e. water and other such as glycerol) is preferably between 15% and 50%. A lubricant, such as lecithin, other phospholipids or monoglycerides, may also be present, e.g. at a level of 0.5–2.5% by weight. An acid, preferably a solid or semi-solid organic acid, such as maleic acid, citric acid, oxalic, lactic, gluconic acid, or a carbohydrate-degrading enzyme, such as amylase, may be present at a level of 0.01–5% by weight of biopolymer; the acid or enzyme assists in slight depolymerization which is assumed to be advantageous in the process of producing nanoparticles of a specific size.

An important step in the process of producing the biopolymer latex is the crosslinking during the mechanical treatment. The crosslinking is preferably reversible, i.e. the crosslinks are partly or wholly cleaved after the mechanical treatment step. Suitable reversible crosslinkers include those which form chemical bonds at low water concentrations, which dissociate or hydrolyze in the presence of higher water concentrations. This mode of crosslinking results in a temporary high viscosity during processing followed by a lower viscosity after processing.

Examples of reversible crosslinkers are dialdehydes and polyaldehydes, which reversibly form hemiacetals, acid anhydrides and mixed anhydrides and the like. Suitable dialdehydes and polyaldehydes are glutaraldehyde, glyoxal, periodate-oxidized carbohydrates, and the like. Glyoxal is a particularly suitable crosslinker for the purpose of producing the latex particles. Such crosslinkers may be used alone or as a mixture of reversible crosslinkers, or as a mixture of reversible and non-reversible crosslinkers. Thus, conventional crosslinkers such as epichlorohydrin and other epoxides, triphosphates, divinyl sulphone, can be used as non-reversible crosslinkers for polysaccharide biopolymers, while dialdehydes, thiol reagents and the like may be used for proteinaceous biopolymers. The crosslinking reaction may be acid- or base-catalyzed. The level of crosslinking agent can conveniently be between 0.1 and 10 weight % with respect to the biopolymer. The cross-linking agent may already be present at the start of the mechanical treatment, but in case of a non-pregelatinized biopolymer such as granular starch, it is preferred that the crosslinking agent is added later on, i.e. during the mechanical treatment.

The mechanically treated, crosslinked biopolymer is then formed into a latex by dispersion in a suitable solvent, usually water and/or another hydroxylic solvent (such as an alcohol), to a concentration of between 4 and 50 wt. % especially between 10 and 40 wt. %. Prior to the dispersion a cryogenic grinding step may be performed, but stirring with mild heating may work equally well. This treatment results in a gel which either spontaneously or after induction by water adsorption, is broken into a latex. This viscosity behavior can be utilized for applications of the particles, such as improved mixing, etc. If desired, the dispersed biopolymer may be further crosslinked, using the same or other crosslinking agents as describe above.

EXAMPLES

The following examples serve to further illustrate the invention. The examples are not intended to limit the invention in any way.

Example 1

Preparation of Biopolymer Latex Adhesive from Starch Nanoparticles

The technique described in WO 00/69916 was used to prepare biopolymer nanoparticles by reactive extrusion processing. Native potato starch (PN), wheat starch (WN), corn starch (CN), and waxy corn starch (WCN) were used to prepare the nanoparticles. The extrudate pellets comprised of starch nanoparticles were then dispersed in water and dispersed using mechanical agitation. The nanoparticles (up to 35% (w/v) solids) were dispersed in 15 to 60 minutes at 45° C. using a 3 blade mixer at 200 rpm. The stability of the resulting biopolymer latex was found to depend on the starch and the level of cross-linking.

Dispersions made with extrusion samples of PN, CN and WN with glycerol and glyoxal were stable for only several hours when the glyoxal content was less than 4 parts, and dried films obtained from these dispersions were not transparent. This is illustrated in Table 1 for PN starch. Dispersions obtained for the reactively extruded PN with 4 and 5 parts glyoxal were stable for up to seven days, and dried films obtained from these dispersions were transparent. On the eighth day, the viscosity of a 24% (w/v) dispersion increased, probably due to retrogradation of uncrosslinked amylose fractions. The sample prepared with an extruder with only transporting elements after injection of 5 parts glyoxal was found to have good film forming properties and stability. A 24% (w/v) dispersion is stable for 7 days and a 12% (w/v) dispersion was stable for 1 month.

TABLE 1

Composition of reactively extruded starches

| | premix [pph]* | | | Crosslinker injection [pph] | |
|---|---|---|---|---|---|
| Sample | starch | water | Glycerol | glyoxal | water |
| 1 | CN | 21 | 18 | 2 | 17 |
| 2 | WN | 21 | 18 | 3 | 17 |
| 3 | PN** | 21 | 18 | 3 | 17 |
| 4 | PN | 21 | 18 | 4 | 17 |
| 5 | PN | 21 | 18 | 5 | 17 |
| 6 | PN | 21 | 18 | 2 | 17 |

TABLE 1-continued

Composition of reactively extruded starches

| | premix [pph]* | | | Crosslinker injection [pph] | |
|---|---|---|---|---|---|
| Sample | starch | water | Glycerol | glyoxal | water |
| 7 | WCN | 21 | 18 | 2 | 17 |
| 8 | WCN | 21 | 18 | 2 | 17 |
| 9 | WCN | 21 | 18 | 3 | 17 |

*pph = parts per hundred parts of dry starch
**PN = native potato starch

In contrast to the results obtained for PN starch, a 24% (w/v) dispersion of reactively extruded WCN starch with only 2 parts of glyoxal was found to have low viscosity and was stable for more than 6 months. Dried films obtained from the dispersion were transparent. The particle size range was determined by Dynamic Laser Light Scattering (DLS) and found to be narrow, ranging from 50–100 nm.

Example 2
Biodegradable School Glue Based on Biopolymer Latex as a Replacement for Synthetic Polyvinyl Acetate Based School Clue Natural polymers, such as starch, generally have very poor shelf life stability. The reason for short shelf life stability of aqueous biopolymer dispersions is twofold: (1) starch adhesive solutions and pastes have a strong tendency to gel or retrograde, with stabilities in the order of hours or days; and (2) starch adhesive in water provides a good growth medium for fungi and bacteria. The consumer has become accustomed to the white polyvinyl acetate latex school glues, which have shelf life stability in excess of 6 months. The data in Example 1 show demonstrate how the problem in point 1 has been addressed. The data in Table 2 show how problem in point 2 has been addressed.

TABLE 2

20% EXL201 dispersions with 1% preservative compared to starch tested at room temperature.

| Non-toxic Preservative | | Time 0 | 1 week | 2 weeks | 1 month | 2 months | 6 months |
|---|---|---|---|---|---|---|---|
| Without preservative | — | 0 | – | – | – | – | – |
| | molds added to dispersion | 0 | – | – | – | – | – |
| Potassium sorbate pH 5.8 | — | 0 | + | + | + | + | + |
| | molds added to dispersion | 0 | + | + | – | – | – |
| potassium sorbate pH 4 | — | 0 | + | + | + | + | + |
| | molds added to dispersion | 0 | + | + | + | + | + |
| benzoic acid pH 4 | — | 0 | + | + | + | + | + |
| | molds added to dispersion | 0 | + | + | + | + | + |
| sodium bisulfite pH 9 | — | 0 | + | + | – | – | – |
| | molds added to dispersion | 0 | – | – | – | – | – |

— = growth of fungi/molds/yeast

The combination of high amylopectin starch nanosphere latex demonstrated in Example 1 and a suitable non-toxic biocide demonstrated in Example 2 to provide a safe, 100% biodegradable school glue with shelf life stability in excess of 6 months, is a unique embodiment of this invention.

Example 3

Adhesives Based on Biopolymer Particles as Bio-Based Replacements for Synthetic Adhesives An important property after paper is glued together, is the strength of the adhesive layer. The SCT value is an indication for the stiffness of the glued paper and the Burst factor is an indication for the strength. The change in strength and stiffness after application of an adhesive layer gives information on the properties of this adhesive layer.

In comparison with polyvinyl acetate (PVA) glue, the strength and stiffness of glued paper increases more when starch dispersions are used (Table 3). This indicates that an adhesive layer of starch dispersion adds more to the properties of the paper than a synthetic glue.

TABLE 3

SCT and Burst of paper and glued paper samples

| | Adhesive Coating (g/m²) | SCT (kN/m) | Burst (kPa) |
|---|---|---|---|
| Paper | 0 | 4.3 | 254 |
| PVA glue 30% (w/w) | 13 | 4.1 | 291 |
| | 16 | 4.2 | 293 |
| Sample 8 (Table 2) | 11 | 4.4 | 321 |
| 30% (w/w) | 9 | 4.4 | 322 |
| Sample 9 (Table 2) | 11 | 4.5 | 337 |
| 30% (w/w) | 14 | 4.2 | 322 |

The results in Table 3 demonstrate that many applications are feasible for adhesives based on biopolymer particles as bio-based replacements for synthetic adhesives.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. An adhesive comprising:
   starch nanoparticles having a size range up to 400 nanometers in diameter, the starch nanoparticles being formed from a starch comprising greater than 95% amylopectin;
   a solvent; and
   a biocide,
   wherein the adhesive has a shelf life stability in excess of 6 months, the shelf life stability being defined as no retrogradation and no gelling and no microbial growth.

2. The adhesive according to claim 1 wherein:
   the starch nanoparticles are formed from corn starch.

3. The adhesive according to claim 1 wherein:
   the adhesive is 100% biodegradable.

4. The adhesive according to claim 1 wherein:
   the biocide is a non-toxic biocide.

5. The adhesive according to claim 1 wherein:
   the biocide is selected from potassium sorbate, benzoic acid, sodium bisulfite, and mixtures thereof.

6. The adhesive according to claim 1 wherein: the solvent is water.

7. The adhesive according to claim 1 wherein:
   the pH of the adhesive is 4–9.

8. A method for adhering two materials selected from packaging materials, paper products, labels or construction materials, the method comprising:
   applying to one or both of the two materials a layer of the adhesive according to claim 1; and
   arranging the two materials such that the layer contacts both of the two materials.

9. The method of claim 8 wherein:
   the adhesive is used to replace a synthetic adhesive derived from petroleum resources.

10. The method of claim 8 wherein:
    the adhesive is used as a bio-based, repulpable, recycling-friendly and/or biodegradable alternative to a synthetic adhesive.

11. The method of claim 8 wherein:
    the adhesive is used as a biodegradable alternative to a polyvinyl acetate latex adhesive.

12. The method of claim 8 wherein:
    the adhesive is used as a biodegradable alternative to a polyvinyl acetate latex adhesive used for school glue applications, packaging applications and/or label applications.

* * * * *